Sept. 10, 1968      D. J. TOMAN      3,401,389

TACTICAL LANDING APPROACH RADIO SYSTEM

Filed March 6, 1967      6 Sheets-Sheet 1

Sept. 10, 1968  D. J. TOMAN  3,401,389
TACTICAL LANDING APPROACH RADIO SYSTEM
Filed March 6, 1967  6 Sheets-Sheet 4

United States Patent Office 3,401,389
Patented Sept. 10, 1968

3,401,389
TACTICAL LANDING APPROACH RADIO SYSTEM
Donald J. Toman, Pleasantville, N.Y., assignor to General Precision Systems Inc., a corporation of Delaware
Filed Mar. 6, 1967, Ser. No. 620,974
8 Claims. (Cl. 343—108)

ABSTRACT OF THE DISCLOSURE

Apparatus for guiding a vehicle toward a predetermined position including microwave transmitter means for establishing a fixed orthogonal set of reference planes in space. The planes are created by encoding each quadrant in the transmitted beam's cross-section with a distinct pair of multiplexed pulse repetition frequencies. A receiver mounted aboard the vehicle includes frequency selective circuits for detecting the transmitted pulse repetition frequencies and distinguishing therebetween. The corresponding signals are then processed to provide positional analog information relative to each plane.

Brief description of the invention

The subject matter herein relates to a greatly improved advanced version of the Tactical Landing Radio System disclosed in Patents 3,197,777 and 3,309,708, both assigned to the assignee of the instant case.

In the aforementioned system a single axis directional reference is created in space by transmitting a rotating conically scanned beam of microwave energy from a position adjacent a landing strip toward an area of expected aircraft approach. The rotation of the beam is synchronized with the phase of the frequency modulated signal introduced at the transmitter to establish a suitable temporal reference at a predetermined point in the rotation cycle. A receiver mounted aboard the aircraft detects the amplitude modulation of the transmitted subcarrier frequency induced by space rotation of the beam and analyzes this signal for both amplitude and phase. The former provides information proportional to the aircraft's distance to the scanning axis whereas the latter, after being compared with the transmitted time based frequency modulated reference which is, by the way, separately detected at the receiver, yields information representing the aircraft's angular orientatioin relative to the axis. The resulting polar coordinate signals are then translated to an orthogonal base and applied to a suitable indicator for displaying the aircraft's positional information to the pilot.

While this scheme has been found to be operative in practice, certain undesirable limitations resulting from the dependence upon a transmitted time based reference have prevented state of the art performance and reliability.

For example, in the prior art system it was recognized that the transmitter generated a main beam antenna pattern which included side lobe patterns as well. Unfortunately, the effect of these side lobes was to create energy nulls in space wherein the strength of the transmitted FM reference signal fell below its corresponding receiver threshold value. This in turn resulted in a contaminated reference detected at the receiver and downgraded system performance. It was also realized that it was possible for the receiver to operate in the region of a side lobe thinking it was in the main beam and thereby induce the pilot to fly a so-called false course. In an attempt to overcome these problems, the previously cited Patent 3,309,708 proposes a technique for transmitting cover beams to mask the undesirable side lobes and to provide FLY-LEFT and FLY-RIGHT information instead. The latter technique, however, fails somewhat short of perfection owing to the fact that it requires additional modulations to be introduced at the transmitter and this accordingly dictates a bulky and complex array of separate demodulating channels in the receiver.

Furthermore, in order to provide optimum course control it is often desirous to separately transmit the localizer and glide-slope references respectively from different physical positions on or near the landing strip. This is impractical in the prior art systems because a single transmitted reference signal is used for both.

The present invention, on the other hand, overcomes all of the above limitations and moreover provides added advantages which will be made apparent in the ensuing discussions.

Speaking generally, the instant subject matter contemplates a rotating conically scanned transmitted microwave beam as in the prior art. As the beam rotates, however, orthogonalized planes are defined in the generated cross-section by encoding each scanned quadrant with a unique pair of multiplexed subcarrier pulse repetition frequencies introduced at the transmitter. For example, as the beam rotates through its upper right hand quadrant, a first subcarrier pulse repetition frequency is generated corresponding to the FLY-LEFT condition. This signal is alternately switched to a second subcarrier pulse repetition frequency corresponding to a FLY-DOWN condition at a multiplex sampling rate higher than the beam rotation frequency. By using a total of only four different discrete pulse repetition frequencies all the quadrants may be encoded in this fashion. As a result, the orthogonalized planes dividing the quadrants are constantly referenced in space and consequently they may be utilized as localizer and glide-slope references, respectively.

In the receiver portion of the invention frequency selection circuits are provided to derive output signals identifying respectively the particular discrete multiplexed pulse repetition frequencies in the quadrant associated with instantaneous aircraft position. The resulting signal pair is then compared with signals corresponding to the multiplexed pulse repetition frequencies in the quadrant shifted 180° in space and the difference taken. The magnitude of the difference signals and their polarity represent the distance and direction, respectively, of the aircraft relative to each orthogonal reference plane, respectively. These signals are subsequently applied to a conventional cross-pointer to indicate the vehicle's instantaneous position relative to the glide-slope and the localizer.

Cover beam insertion is completely integrated at the transmitter on a time shared basis. Employing an asynchronous cover beam insertion rate as contrasted to the multiplex sampling rate, side cover beams are generated in space by overriding the multiplex rate generator at the transmitter and transmitting separate cover beams having pulse repetition frequencies corresponding to FLY-LEFT or FLY-RIGHT informations respectively. As a result the receiver does not have to distinguish between main beam and cover beam transmissions and shares the same circuitry for each function.

*Detailed description of the invention*

Figure 1:
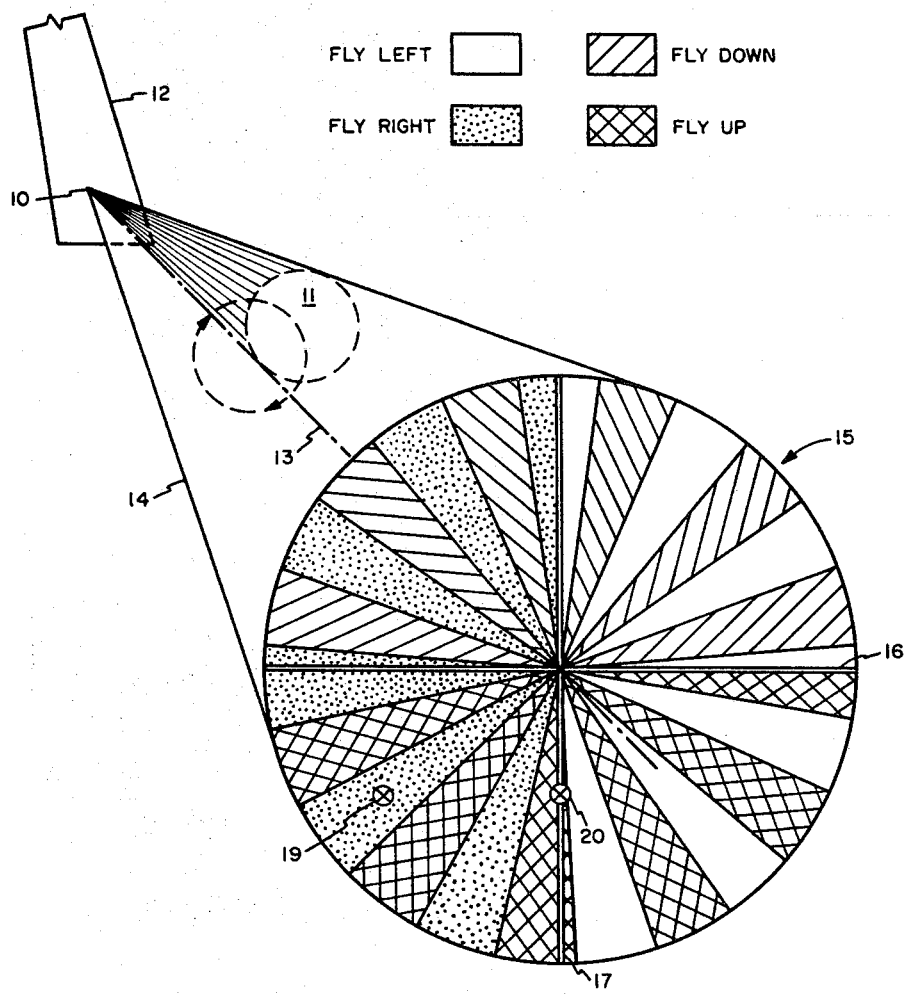
FIG. 1 is a schematic rendering of the transmitter according to the invention.

Referring to FIG. 1, a transmitter located generally at 10 radiates a narrow cone 11 of microwave energy away from runway 12 toward a predetermined area of expected aircraft approach. For the present assume that the transmitter is aligned parallel to the runway centerline and boresighted at an elevated angle equal to a preselected glide-slope. Means are provided at the transmitter for rotating cone 11 about axis 13 to generate a large conically shaped beam 14 having a scanned cross-section indicated generally by reference character 15. Although the scanned cross-section is shown here to be circular in shape, this is done merely for simplicity of presentation; it being understood that in practice the cross-section is preferably elliptical in shape and has its major axis horizontally disposed relative to the ground.

Beam 14, or more correctly beam 11, is generated in a known manner, such as, by way of example, plus modulating a magnetron with a subcarrier having a suitable pulse repetition rate and then feeding the magnetron output to a suitable antenna structure.

In accordance with the principles of the invention additional means are provided at the transmitter for orthogonally referencing the beam cross-section in space. To this end, different pulse repetition rates are periodically introduced at the transmitter in position correspondence with particular portions of the beam scanning cycle. More specifically, a total of four different discrete pulse repetition rates are utilized to frequency key four orthogonally related half-scan intervals in the beam rotation sequence. That is, during the upper-half scan a pulse repetition rate of, say 104 kHz. is applied to the transmitter magnetron as represented, for example, by the shaded pie slices in FIG. 1. When the lower-half of the beam cross-section is scanned, however, a different pulse repetition rate of, say, 103 kHz. is applied to the transmitter magnetron as indicated by the cross-hatched pie slices in FIG. 1. Similarly, when the beam scans the right-half plane a third pulse repetition frequency, for example, 102 kHz. is applied to the transmitter magnetron. And, finally, when the beam scans the left-half plane, a pulse repetition rate of 101 kHz. is applied to the magnetron; the former being indicated by the blank pie slices and the latter being represented by the stippled pie slices shown respectively in FIG. 1. Note that the scans in the right and left planes are mutually perpendicular with respect to the scans in the up and down planes, respectively, and that the scans are phase locked to rotation of the beam. For this reason, a different unique pair of pulse repetition frequencies always defines in the same fixed position in space a corresponding quadrant in the beam's cross-section. In order to use only a single transmitter channel and antenna structure, the pulse repetition frequencies are multiplexed at the transmitter at a sampling rate asynchronously related to the beam rotation frequency. This in turn enables information corresponding to each discrete PRF to be detected eventually in each quadrant on a time-shared basis and utilized at a receiver mounted aboard the approaching aircraft. Moreover, each pulse repetition rate is encoded to correspond a directional reference relative to either one of the orthogonal planes 16, 17 dividing the four quadrants in space. Thus each quadrant may be considered to contain within its own volume position referring data. Specifically, what is meant by this is that the 104 kHz. PRF may be encoded to represent that for any position in the upper-half plane the orthogonal plane 16 is DOWN. In similar fashion, the 102 kHz. PRF indicates that for any position in the right-half plane the orthogonal plane 17 is to the LEFT. Likewise, the 103 kHz. PRF represents that for any position in the lower-half plane the reference plane 16 is UP and the 101 kHz. PRF indicates that for any position in the left hand plane, the orthogonal reference plane is to the RIGHT.

On a scan-to-scan basis the relative phase positions of the two pulse repetition frequencies allocated to each quadrant must change within that quadrant in order for the receiver aboard the approaching aircraft to distinguish each discrete pulse repetition frequency identifying that quadrant, especially so when the aircraft occupies the same relative spatial position in a particular quadrant over a finite time interval. In other words, in terms of FIG. 1, the pie slices in each quadrant must rotate past the aircraft in asynchronism with the rotation of beam 11 past the aircraft when the latter is flying in that quadrant. This requirement is met by employing a multiplex sampling rate different from the beam rotation rate.

Obviously, if the pie slices in each quadrant did not rotate, so to speak, an aircraft flying a constant error course relative to the intersection axis of the orthogonal planes would intercept the same pie slice every beam revolution. The receiver, therefore, would only detect a single pulse repetition frequency and acquire position data relative only to a single plane.

Thus, there are two available pie slices in each quadrant representing information relative to each orthogonal plane in a set of two fixed in space. As a result, the aircraft will always be position referenced relative to both the planes once it has entered the beam's cross-section and regardless of which quadrant it is flying in.

This will become clear by considering the following example. Let it be assumed that the aircraft is flying off-axis in the lower left-most quadrant as viewed in FIG. 1 at a position represented therein by reference character 19. As beam 11 rotates past the aircraft, the onboard receiver senses that the pulse repetition frequency of the transmitted beam at that time and point in space is 101 kHz. as indeed indicated by the stippled pie slice. The receiver interprets this event (in a manner to be described in detail below) and derives information therefrom indicating that the aircraft must fly RIGHT in order to intercept the orthogonal reference plane 17. At this juncture, detection of the 101 kHz. signal therefore provides LOCALIZER information.

A very brief moment later, the beam 11 again scans past the aircraft which is still located at 19. However, due to the previously mentioned asynchronous multiplex sampling rate the pie slices in the lower left quadrant have rotated to new positions within the quadrant. As a result, the aircraft now intercepts a cross-hatched pie slice although it has not necessarily changed its course. Accordingly, the receiver will now sense that the beam's pulse repetition frequency is 103 kHz. and derive information therefrom indicating that the aircraft should fly UP to intercept the orthogonal reference plane 16. Thus by subsequently detecting the 103 kHz. PRF in the lower left quadrant the aircraft is also provided with GLIDE-SLOPE information. This same procedure is followed in each of the remaining three quadrants; the particular pulse repetition frequencies multiplexed therein respectively providing constant position data relative to the localizer and glide-slope planes 16, 17 over a finite time interval equal to $1/2f_s$ where $f_s$ is equal to the multiplex sampling rate.

Figure 3:
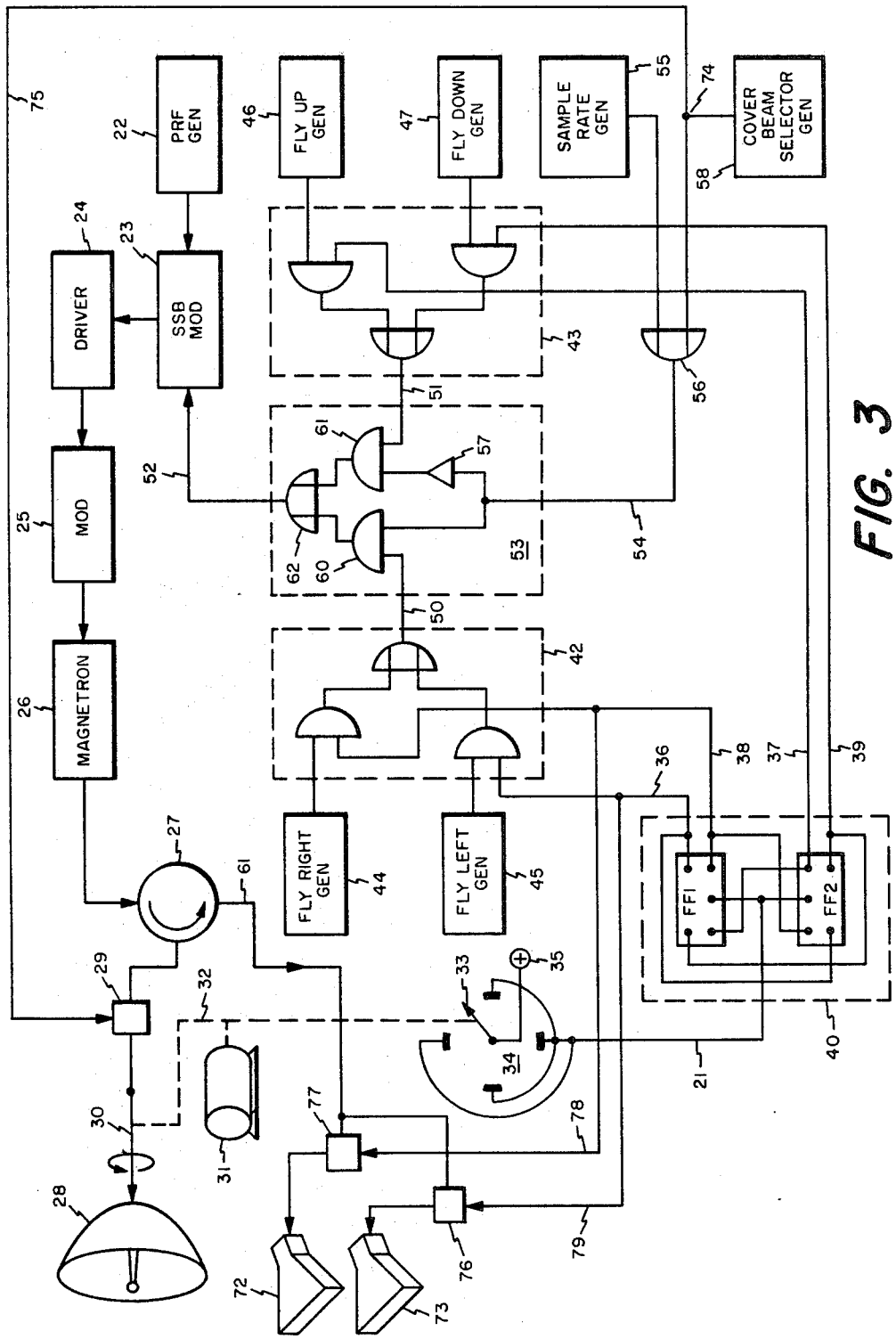
FIG. 3 is a block diagram of the transmitter according to the invention.

Turning now to FIG. 3, the instrumentation of the transmitter according to the invention will be described.

A subcarrier frequency generator 22 which may comprise, for example, a conventional square wave oscillator feeds driver 24 through a standard single sideband modulator 23. Conventionally, the driver raises the output voltage of the single sideband modulator to a sufficient level for pulsing magnetron 26 via amplitude modulator 25. The frequency of the output signal emitted by oscillator 22 constitutes the magnetron's pulse repetition frequency absent any modulation in block 23. This frequency may be any suitable value; however, by way of illustration, it is preferably in the neighborhood of 100 kHz. Similarly, the carrier frequency of magnetron 26 may have any suitable value in the microwave region such as, for example, 15.5 gHz.

The output of the magnetron is applied to a conventional three-armed microwave circulator indicated schematically by reference character 27. Usually a ferrite device, the circulator is adapted to receive microwave energy through one arm and circulate it in the direction of the arrow until it leaves through the next or second arm. Connected within the second arm however, is a conventional microwave switching diode 29. As is well-known, when a suitable voltage drop is applied across the diode the latter acts as a barrier to the impinging microwave energy reflecting it back from whence it came. Thus when the switching diode is energized, the energy in the circulator continues to circulate and exits through the third arm and into wavegide 61. Nonetheless, for the present, assume that the switching diode is nonbiased and that the pulse modulated microwave energy flows through the circulator's second arm and is applied via conventional microwave plumbing fixtures (not indicated) to a main beam antenna assembly represented generally by reference character 28.

The antenna assembly 28 is preferably of the type capable of generating a thin rotating conically scanned beam of microwave energy. Such antennas are widely known, one of which is represented in FIG. 3, for example, as comprising a subreflector element 30 rotatably mounted inside a parabolic reflecting dish. As schematically indicated the subreflector element is adapted to be driven by motor 31 through shaft linkage 32.

Thus, when switching diode 29 is unbiased antenna 28 transmits main beam 14 as represented in FIG. 1, for example.

Motor 31 which preferably rotates at a frequency of 100 Hz. also drives rotating waper arm 33 in quadrant-scan trigger generator 34. In the form described herein by way of example, trigger generator 34 includes arcuately spaced contacts every 90° of rotation beginning at top-dead-center. Conventionally, each contact electrically couples an output conductor 21 to a suitable voltage source 35 through wiper arm 33.

Inasmuch as subreflector 30 and wiper arm 33 are position synchronized through common shaft linkage 32 at every point in their respective rotations, a corresponding pulse will be emitted along conductor 21 each time main beam 14 begins to scan one of its quadrants. Accordingly, conductor 21 will apply a 400 Hz. pulse train to block 40 as shown.

The latter is instrumented to comprise, for example, a pair of flip-flops coupled in such a manner whereby each output of one flip-flop is feedback connected to the non-corresponding input of the other flip-flop and vice-versa. In addition, conductor 36 serves as a common clock input for both flip-flops. As is well-known in the art, the effects of this circuit arrangement are twofold. First, the frequency of each of the four outputs is stepped down by a factor of four re the clock input frequency. Second, and most importantly, the corresponding outputs of each flip-flop (remembering that there are two) exhibit a quadrature phase relation as respects one another.

Figure 4:
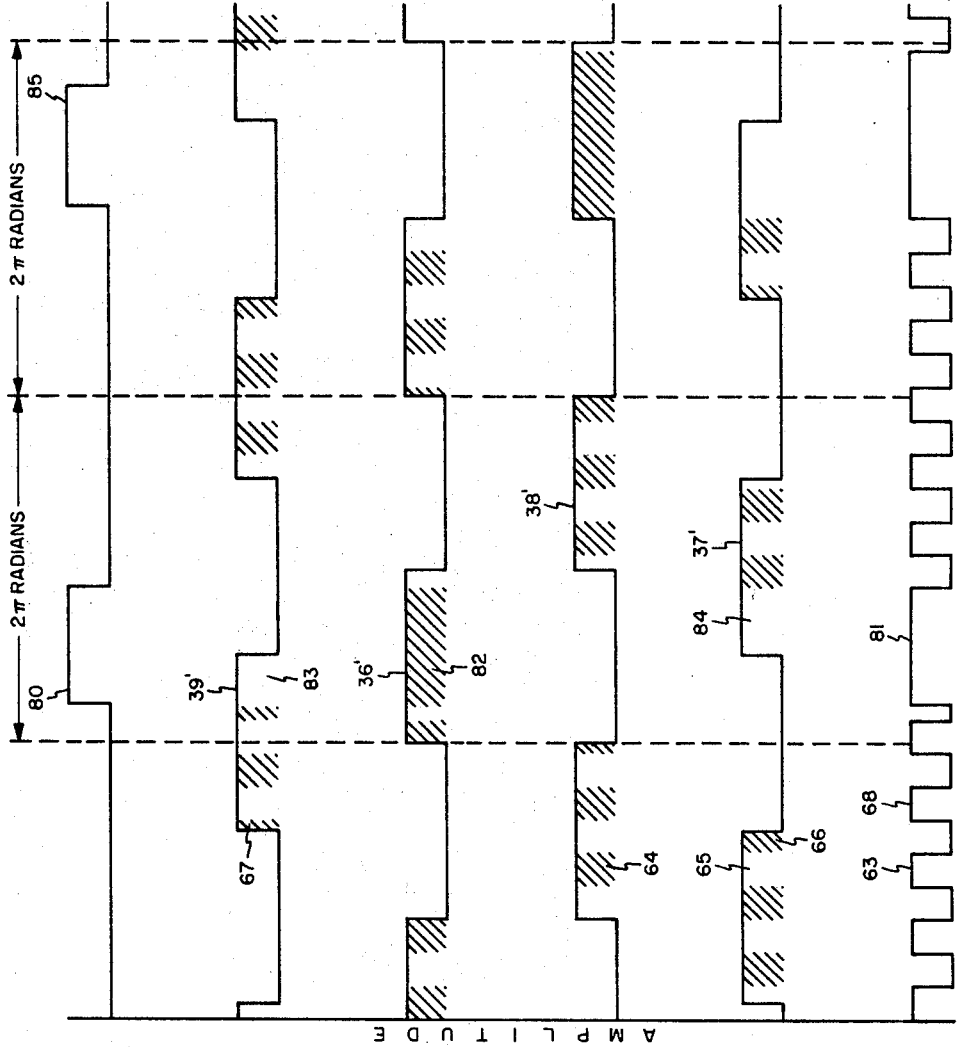
FIG. 4 is a graphical representation of the various signals generated in the transmitter portion of the invention.

To appreciate this more completely, consider FIGURE 4, graphs B–E which are representations of the voltage waveforms appearing along each of the output conductors 36–39 of block 40, respectively. As seen therein, each of the signals of interest is a square wave and each has a frequency equal to the beam rotation rate, the latter being indicated by the distance between the dashed vertical lines. Also observe that during each 90° interval in the beam scanning cycle a different pair of voltage waveforms is in an up or conducting condition. This is especially noteworthy because when a particular block 40 output signal is conducting, a corresponding pulse repetition frequency will be applied to the transmitter magnetron.

For example, let it be assumed that block 40 has just been clocked by a first pulse from trigger generator 34 and that beam 11 has just passed the top-dead-center position and is beginning to scan the upper-right quadrant as seen in FIG. 1. Hence, in the time domain, the beam scan position should be immediately to the right of the left most dashed line as viewed in FIG. 4 graphs A–F. At this point, the signal on line 36, FIG. 3, is represented in graph C by pulse 36′ which has just switched into its up condition. Coincidently, as indicated in FIG. 1, a pulse repetition frequency corresponding to the blank pie slices will be applied to the magnetron modulator 25 during the next 180° of beam rotation. At the same time, due to the inherent operation of the circuit in block 40, the output signal on line 39 indicated in graph B by pulse 39′ is also in the up condition but leads the signal on line 36 by 90° Therefore it will be switched down after only 90° of beam rotation upon the occurrence of a second trigger pulse from unit 34. Accordingly, the signal on line 39, namely, pulse 39′, graph B, corresponds to the transmission of a pulse repetition frequency represented by the shaded pie slices in FIG. 1. Still at the same point in time, and again due to the operations in block 40, the voltage waveform on line 38, FIG. 3, appears 180° out of phase vis-a-vis the signal on line 36; therefore it is in a nonconducting condition. However, when the signal on line 38 represented by pulse 38′ in graph D is eventually switched into its conducting state at the half way point in the scanning cycle, or after the third clock pulse has been fed into block 40, a pulse repetition frequency corresponding to the stippled pie slices will be transmitted as shown in FIG. 1. Finally, as indicated by pulse 37′, graph E, the signal on line 37, FIG. 3, leads the signal on line 38 by 90°, lags the signal on line 36 by 90° and is 180° out of phase with the signal on line 39. Therefore, upon the appearance of the second clock pulse from trigger generator 34 corresponding to the commencement of the scan of the lower-right quadrant of the beam, it will be switched into the up state and a pulse repetition frequency associated with the cross-hatched pie slices, FIG. 1, will be generated at the transmitter for a half-scan interval.

In retrospect, it will be appreciated that block 40 generates timing signals in the correct sequence for keying the shift of the transmitter pulse repetition rate in the desired manner as will be explained immediately below.

Referring once more to FIG. 3, lines 36, 38 carry their respective signals to RIGHT/LEFT selector 42 and likewise, lines 37, 39 conduct their respective signals to UP/DOWN selector 43. Simultaneously, FLY RIGHT pulse generator 44 and FLY LEFT pulse generator 45 respectively feed 1000 Hz. and 2000 Hz. square waves into selector 42 whereas FLY UP pulse generator 46 and FLY DOWN pulse generator 47 respectively feed 3000 Hz. and 4000 Hz. square wave into selector 43. Conventionally available, these pulse generators are preferably of the crystal controlled type to insure stability of frequency in their respective outputs. On the other hand, each selector 42, 43 as indicated comprises a logic network comprising two AND gates feeding an OR gate. Thus, as long as line 36 remains high, a FLY LEFT 2000 Hz. pulse train will be made available on line 50. Similarly, when line 36 is down and line 38 is high (they are never high at the same time) a FLY RIGHT 1000 Hz. square wave will appear on line 50. In the same manner, when line 37 is conducting, a FLY UP 3000 Hz. square wave appears along conductor 51 and when line 39 is high, a FLY DOWN 4000 Hz. square wave is made available on line 51. Due to the mutual quadrature phase relation among the timing signals emitted by block 40 (as clearly shown in FIG. 4, graphs B–E) there will at all times be simultaneously present on lines 50, 51 respectively, two square waves having discretely different frequencies with one of frequencies on one of the lines changing to still another discrete value every 90° of beam rotation in alternation.

Lines 50, 51 couple their respective varying frequency signals to a GLIDE-SLOPE/LOCALIZER MULTIPLEXER generally indicated by reference character 53. Also being fed into the multiplexer along conductor 54 is a square wave pulse train having a frequency of, say, 256 Hz. The latter pulse train is continuously generated by a standard multiplex SAMPLING RATE generator 55 and is coupled to conductor 54 through a conventional OR gate 56 whose purpose will be described hereinbelow.

Broadly speaking, the function of the multiplexer 53 is to alternately select the signals on lines 50, 51 and to switch them to line 52 at the sampling rate of 256 Hz. To illustrate this, reference is again made to FIG. 4 graph B–F, wherein graph F is a graphical representation of the voltage waveform of the sampling-rate generator output signal entering multiplexer 53 on conductor 54.

At a point in the beam scanning cycle defined by the leading edge of sample pulse 63, graph F, the signals on lines 38, 37 are high respectively; therefore, the FLY RIGHT 1000 Hz. square wave is present on line 50 while the FLY UP 3000 Hz. square wave appears on line 51. Accordingly, during the half-cycle interval when sampling pulse 63 remains high, the 1000 Hz. signal on line 50 passes through AND gate 60, OR gate 62, and onto conductor 52 as indicated by the shaded area 64, graph D. All of the while, inverter 57 inhibits the 3000 Hz. signal on line 51 from passing through AND gate 61. This is indicated by the non-shaded area 65, graph E.

Thereafter, sampling pulse 63 goes low for its remaining half-cycle and during this interval the 1000 Hz. signal is inhibited from passing through AND gate 60. However, the 3000 Hz. signal on line 51 now is passed through AND gate 61 because of the inverting function of inverter 57. Hence, as indicated by the shaded area 66, graph E, the 3000 Hz. signal appears on line 52. Note further, that during the down half-cycle of pulse 63, the beam begins to scan a new quadrant (i.e., the upper left quadrant as viewed in FIG. 1) and consequently the FLY UP 3000 Hz. signal on line 51 and therefore line 52 switches to a FLY DOWN 4000 Hz. signal as clearly indicated by the shaded area 67, graph B. The next sampling pulse 68 then appears along conductor 54 and the multiplexing cycle is repeated.

In view of the foregoing it should now be apparent that multiplexer 53 emits a continuous signal along conductor 52 comprising a different pair of alternating discrete frequency components each time main beam 14 scans a new quadrant. This continuous signal is then applied as a modulating voltage to the single sideband modulator 23 described previously in connection with FIG. 3. Recalling that the subcarrier frequency being continuously applied to this modulator from PRF generator 22 comprises a 100 kHz. signal, the frequency of the single sideband modulation product fed to magnetron driver 24 and therefore the pulse repetition frequency of the magnetron may be expressed as $$100 + f_o \qquad (1)$$

where $f_o$ is equal to the discrete frequency content of the signal appearing on line 52 at any particular moment. Accordingly, if an aircraft were to be flying in the upper-right quadrant of main beam 14, its receiver would detect pulse repetition frequencies of 102 kHz. and 104 kHz. alternating at the sampling rate of 256 Hz. and the pilot would ultimately know that he would have to steer LEFT and DOWN respectively to intercept the glide-slope/localizer axis. If in the lower-right quadrant of the beam, the receiver would detect pulse repetition frequencies alternating between 102 kHz. and 103 kHz. and corresponding to FLY LEFT and FLY UP directions, respectively. Similarly, in the lower-left quadrant detected pulse repetition frequencies of 103 kHz. and 101 kHz. would indicate FLY UP and FLY RIGHT directions respectively, while in the upper-left quadrant detected pulse repetition frequencies of 101 kHz. and 104 kHz. would indicate that the pilot must FLY RIGHT and FLY DOWN, respectively.

Figure 2:
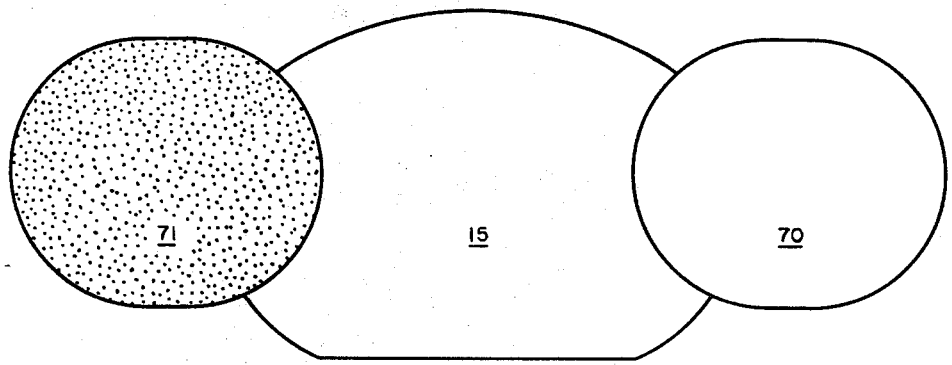
FIG. 2 is a sketch showing the relation of the cover beams to the main beams.

The transmitter according to the present invention furthermore includes means for generating two auxiliary side cover beams. The reasons for employing cover beams are explained in detail in commonly assigned Patent 3,309,-708, and therefore will not be repeated herein. Suffice it to say that the cover beams serve two basic functions, namely, to mask undesirable side lobes produced during generation of the main beam and to provide directional information to the pilot when the latter is desirous of steering his aircraft into the main beam's cross-section. FIG. 2 represents generally the relationship among the main beam's cross-section 15, the cross-section of the left cover beam 70, and the cross-section of the right cover beam 71.

Turning to FIG. 3 once more, cover beam 70 is transmitted preferably by a conventional microwave horn type antenna 72 mounted adjacent the main beam antenna assembly 28 on the latter's left side. Likewise, cover beam 71 is radiated through conventional microwave horn type antenna 73 which latter is adjacently mounted on the right side of antenna assembly 28. The two horn antennas are parallel boresighted relative to antenna 28.

In principle, the cover beams are transmitted on a time shared basis at the expense of main beam transmission. That is, when the previously mentioned switching diode 29 is energized by an appropriate command signal along conductor 75 the magnetron output signal passes through circulator 27 and out through the latter's third arm thereby-passing main beam antenna 28. The microwave energy from the magnetron then travels through waveguide 61, either one of switching diodes 76, 77 and finally through either one of the horn antennas 72, 73. As shown, the FLY RIGHT and FLY LEFT scanning signals generated in block 40 are coupled to switching diodes 76, 77 respectively through circuit path means 78, 79, respectively. By this arrangement horn antenna 72 transmits only during the corresponding time interval when the FLY LEFT signal on line 36 is high since the latter passes through conductor 79, biases diode 76 and gates antenna 73 off. In similar fashion, horn antenna 73 will transmit only during the beam scanning cycle when the FLY RIGHT signal on line 38 is high because this same signal will be conducted along line 78 to bias diode 77 and gate antenna 72 off.

Now if some means could be provided at the transmitter to override multiplexer 53 and directly couple line 50 to conductor 52 throughout the entire fraction of time in the beam rotation cycle reserved for cover beam transmission, then the cover beams 70, 71 radiated by auxiliary antennas 72, 73, respectively, will have constant pulse repetition frequencies of 102 kHz. and 101 kHz., respectively, and they will therefore be able to direct the aircraft to FLY LEFT or FLY RIGHT toward main beam cross-section 15. Such means are present at the transmitter in the form of COVER BEAM SELECTOR generator 58 and conventional OR gate 56.

The former comprises a rectangular wave generator such as, for example, a standard free-running multivibrator connected in triggering relation to a conventional one-shot multivibrator to produce a rectangular pulse train having a duty cycle of approximately 26% and a frequency of roughly 145 Hz. This rectangular waveform is represented in graph A of FIG. 4.

Referring to the latter in connection with graphs B–F and FIG. 3, consider the case wherein a rectangular pulse 80 appears at the output terminal 74 (FIG. 3) of cover beam selector generator 58 early in the first-half scan of the beam rotation cycle. The pulse travels along conductor 75 and biases switching diode 29 thereby switching the flow of the magnetron's output from main antenna assembly 28 to auxiliary antenna fed waveguide 61 as OR gate 56 which functions to effectively override the output of sample rate generator 55 inasmuch as the OR gate output signal now appears along conductor 54 in the form of pulse 81, graph F. Stated differently, when both inputs to OR gate 56 are high the sample rate generator square wave output is clamped at its high voltage level for a period of time equal to the width of pulse 80. Consequently during the time pulse 80 is high, multiplexer 53 couples the signal on line 50 to conductor 52 through AND gate 60 and OR gate 62 while inverter 57 inhibits the signal on line 51. Also, graph C indicates that when pulse 80 is high, line 36 is high; therefore, auxiliary antenna 72 transmits a cover beam having a pulse repetition frequency of 102 kHz. for a period of time indicated by the shaded area 82, graph C. Significantly, during this same time interval no glide-slope information (i.e., FLY UP/ FLY DOWN) is being multiplexed onto the transmitted signal as indicated by the unshaded areas 83, 84 in graph B and E, respectively.

When, in the time domain, pulse 80 finally terminates, the transmitter reverts to main beam transmission and multiplex 53 functions in its previously described steady-state mode. The next pulse 85 in the cover beam selector wave train then appears and the cover beam insertion cycle is repeated. Note, however, that the cover beam insertion rate is asynchronously related to both the beam scanning rate (graphs B–E) and the multiplex sampling rate (graph F). Thus, the immediately succeeding cover beam insertion cycle defined by pulse 85 occurs at a relatively later time in the next beam rotation sequence as is clearly indicated. In fact, when pulse 85 next appears the FLY RIGHT signal is high on line 38 and auxiliary antenna 73 transmits a cover beam having a pulse repetition frequency of 101 kHz.

Figure 5:
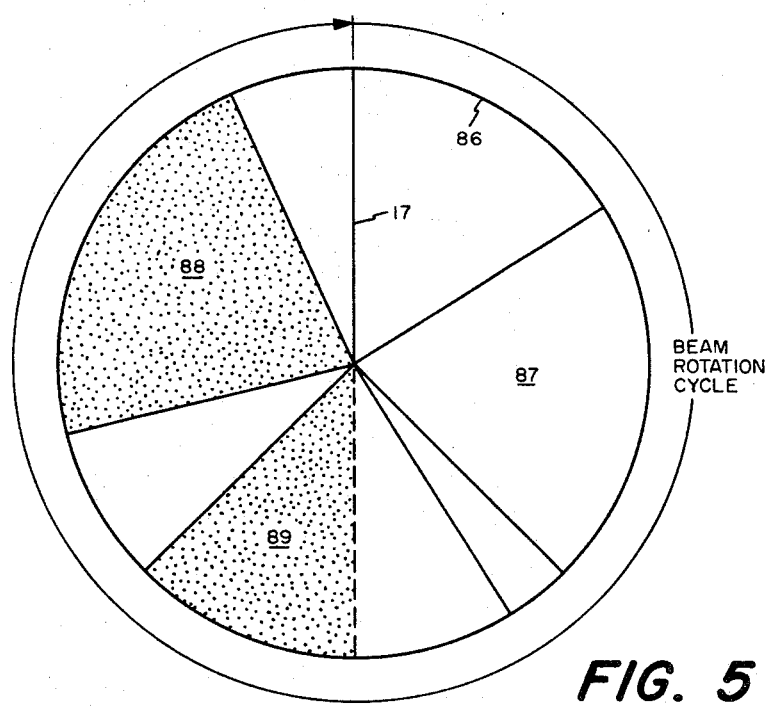
FIG. 5 is a timing diagram depicting the cover beam generation sequence.

In this connection, attention is directed to FIG. 5 wherein circle 86 represents the beam scanning cycle in the time domain and line 17 designates the localizer reference or the time division between the right-half and left-half scans. Blank pie slice 87 represents the cover beam insertion cycle corresponding to pulse 80 (graph A) whereas the stippled pie slice 88 corresponds to the next cover beam insertion cycle defined by pulse 85, graph A. It must be emphasized that the latter occurs not in the same beam rotation cycle as the pulse 80 cover beam insertion cycle occurs but one complete beam rotation cycle later as indicated in graph A. The pie slice 87 being blank indicates that its corresponding cover beam is transmitted from antenna 72 and has a PRF of 102 kHz. Likewise, since pie slice 88 is stippled its associated cover beam is transmitted by antenna 73 and has a PRF equal to 101 kHz.

Now consider what happens when a cover beam insertion pulse appears in overlapping time relation between the right-half and left-half scans during the nth beam rotation cycle as is certain to happen because of the asynchronous rate of the cover beam selector generator. Under these conditions the corresponding cover beam insertion cycle is represented in FIG. 5 by pie slice 89. As indicated thereby, both cover beams will be transmitted in duplexed fashion. What is meant by this is that during the interval when the cover beam insertion pulse coincides with the right-half scan in the beam rotation sequence, antenna 72 will transmit a cover beam having a PRF of 102 kHz. Subsequently, at that point in time when the localizer is crossed and the beam rotation cycle begins its left-half scan, antenna 73 will be switched on to transmit a cover beam having a PRF of 101 kHz. while antenna 72 will be shut down by the action of the FLY RIGHT signal on line 38 and switching diode 77 (FIG. 3).

In summarizing, it should be understood that on a scan-to-scan basis the pie slices representing the cover beam insertion intervals rotate as viewed, for example, in FIG. 5 just as the pie slices representing the different pulse repetition frequencies rotate as viewed in FIG. 1 albeit at a different rate. Moreover, whichever half-scan in the beam rotation cycle appears in time coincidence with the rectangular cover beam selector output pulse or any portion thereof will determine which cover beam, i.e., the right or the left, is transmitted and accordingly which PRF the transmitted beam will have. Conversely, as indicated in FIG. 2 the right cover beam will always be transmitted through antenna 73 and have a pulse repetitive frequency corresponding to FLY RIGHT and the left cover beam will always be transmitted via antenna 72 and have a pulse repetition frequency corresponding to FLY LEFT.

Figure 6:
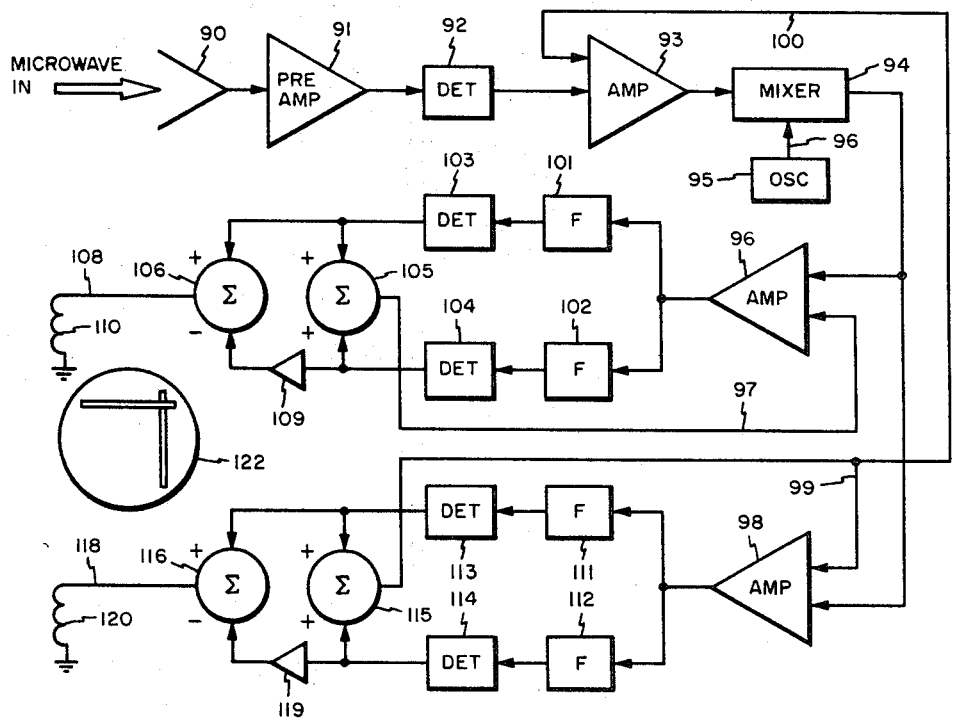
FIG. 6 is a circuit diagram of the receiver portion of the invention.

Referring to FIG. 6, the receiving apparatus in accordance with the present invention will now be described. The receiver is suitably mounted aboard the approaching aircraft and includes, for example, a conventional microwave receiving horn type antenna represented generally by reference character 90. Now let it be assumed that the aircraft is flying somewhere in the zone defined by the cross-section of auxiliary cover beam 71 (FIG. 2) at a time when a cover beam selector pulse is high at terminal 74 and a FLY RIGHT pulse is high on line 38 (FIG. 3). The microwave carrier of the transmitted cover beam therefore has a pulse repetition frequency of 101 kHz. modulated thereon. This pulse modulated microwave signal is received via antenna 90 and fed to a standard microwave preamplifier 91 for amplification. From there it is applied to a video detector 92 and a video amplifier 93 wherein the 101 kHz. modulation is recovered and the carrier frequency is suppressed in a conventional manner. Thus the output of video amplifier 93 comprises a substantially sinusoidally varying waveform having a frequency content of 101 kHz. This signal is then applied to mixer 94 which all of the while is being keyed by a 100 kHz. signal derived along conductor 96 from conventional oscillator means 95. As a result, mixer 94 provides an output signal on line 97 which is beat down to 1000 Hz. The latter signal is then coupled to an audio amplifier 96 which includes a low-pass filter network (not shown) in its input stage. The filter network is particularly adapted to pass frequencies below 2000 Hz. and reject frequencies above 2000 Hz. As shown, amplifier 96 couples its output signal simultaneously to two frequency selective circuits one of which includes a bandpass filter 101 sharply tuned to 1000 Hz. and a diode detector 103 for rectifying the filter's output. In the other frequency selection circuit, a bandpass filter 102 sharply tuned to 2000 Hz. feeds diode detector 104 in the same fashion. Hence, the 1000 Hz. signal is amplified in amplifier 96, passed by filter 101, rejected by filter 102 and rectified in detector 103. The last mentioned produces a positive D.C. potential, the amplitude of which is proportional to the amplitude of the 1000 Hz. signal available at the output of amplifier 96. This D.C. signal is then applied to summing point 106 and thereafter to conductor 108 for application to the actuating movement 110 of the localizer bale in a conventional cross-pointer indicator represented generally by reference character 122. Accordingly, in response to the positive D.C. potential on conductor 108, the localizer bale moves off its centered null position and deflects full scale to the right indicating to the pilot that he must steer his aircraft to the right to enter the main beam's cross-section.

If, on the other hand, the aircraft were to be flying in the cross-section of the other cover beam 72 (FIG. 2) a pulse on line 36 will eventually be high in coincidence with a beam selector pulse appearing at terminal 74 (FIG. 3). In this situation auxiliary antenna 72 will transmit a beam having a PRF equal to 102 kHz. It follows that the output of amplifier 96 under these circumstances will consist of a 2000 Hz. Signal which will subsequently be rejected by filter 101, passed by filter 102 and rectified in detector 104. The positive D.C. potential emitted by the latter will then pass through a conventional inverter 109 wherein it is made negative and thence passes through summing point 106 onto conductor 108. The localizer bale actuating coil now being confronted with a negative D.C. potential deflects from its null centered position to the left indicating to the pilot that he must guide the aircraft to the left in order to enter the main beam. Although the immediately preceding discussions relate to cover beam reception during specific instances in time corresponding to the duration of a single cover beam selector pulse it will be appreciated that the receiver actually responds to the cover beam information at a rate much slower than the cover beam selector rate. In point of fact the frequency response of the receiver is determined by the longest time constant of any one of its components which latter may include, for example, the actuating movement of the indicator bales in the cross-pointer indicator 122. In other words, the receiver's indicator will reflect events averaged over a finite time interval encompassing a relatively large number of cover beam selector intervals and/or beam rotation cycles. This finite time interval, therefore, defines the system's averaging time constant. It follows that when the aircraft is flying a particular cover beam, a small amplitude signal corresponding to the pulse repetition frequency of the cover beam not being flown will also appear at the output of amplifier 96 over a period of time defined by the system's averaging time constant since statistically speaking, the time devoted to transmission of each cover beam during this period of time is nearly the same. However, at no time is the small amplitude signal ever large enough to prevent the relatively large amplitude signal corresponding to the cover beam actually being flown from deflecting the indicator bale full-scale.

Now consider the case where the pilot has successfully guided his aircraft into the main beam's cross-section but has not as yet locked onto the intersection of the glide-slope/localizer planes. Hence, for illustration purposes, let the aircraft's new position again be represented by reference character 19, FIG. 1. Also, let it be assumed that the main beam is being transmitted in its multiplexed steady-state mode.

As beam 11 rotates in space at 100 Hz., antenna 90 receives a steady stream of microwave signals reflecting the different pulse repetition frequencies multiplexed in each consecutive quadrant. Moreover, the rotation of the beam impresses an additional amplitude modulated signal component upon the received microwave carrier. That is, the received signal strength increases as beam 11 rotates toward the aircraft's position reaching a maximum at 19 where the center of beam 11 is on the same radial as the aircraft. The signal strength then decreases as the beam rotates past the aircraft reaching a minimum at a radial position 180° removed from the aircraft's position. Hypothetically speaking, therefore, if one were to frequency analyze the output of amplifier 93 over an interval of time equal to the receiver's averaging time constant a complex variable frequency signal would be observed having, in terms of amplitude, maxima at 101 kHz. and 103 kHz. and minima at 102 kHz. and 104 kHz. As previously described in connection with the cover beam receiving mode, the output of amplifier 93 is fed to mixer 94, which latter is being keyed by the 100 kHz. signal obtained from oscillator 95. Thus, during main beam reception mixer 94 produces an output signal having frequency components therein heterodyned to 1, 2, 3 and 4 kHz. respectively, while preserving maximum and minimum amplitudes at 1 kHz., 3 kHz., and 2 kHz., 4 kHz., respectively. As indicated in FIG. 6, the output of mixer 94 is then fed simultaneously to audio amplifiers 96, 98.

It was pointed out previously that amplifier 96 included a low-pass prefiltering network for passing signal frequencies below 2000 Hz. Amplifier 98, on the contrary, includes a high-pass prefiltering network for passing signal frequencies above 2000 Hz. Hence, the 1 kHz. and 2 kHz. signal components corresponding to FLY RIGHT and FLY LEFT respectively are shuttled through amplifier 96 while the 3 kHz. and 4 kHz. frequency components corresponding to FLY UP and FLY DOWN respectively are being diverted to amplifier 98. This being the case, the frequency selection circuits following amplifier 96 may be referred to as the LOCALIZER CHANNEL and likewise, the selection circuits coupled to amplifier 98 may be termed the GLIDE-SLOPE CHANNEL. The selection circuits in each channel are identical but for the filters 101, 102 on the one hand and filters 111, 112 on the other. The former as discussed earlier are narrowly tuned to 1 kHz. and 2 kHz., respectively, while the latter are narrowly tuned to 3 kHz. and 4 kHz., respectively. Therefore, the dual frequency components in the output signal of each amplifier are respectively segregated by the corresponding branches in each channel. Thus in the same fashion discussed above relative to the operation of the localizer channel in the cover beam reception mode, the 3 kHz. component in the output of amplifier 98 is selected by filter 111 rectified in detector 113 and passed to summing point 116 in the form of a positive D.C. potential. All of the while, the 4 kHz. signal component is routed through filter 112, rectified in detector 114, made negative in inverter 119 and passed to summing point 116.

Figure 7A:
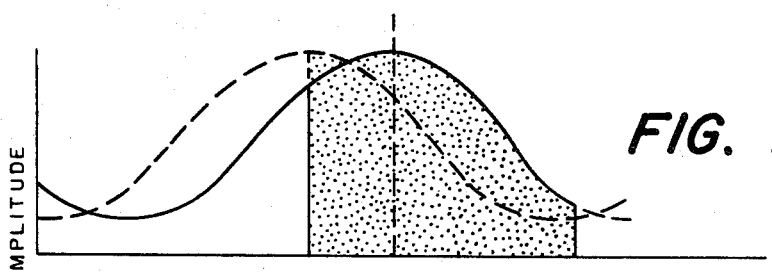
FIGS. 7A and 7B are graphical representations of the received signal as a function of beam rotation.
Figure 7B:
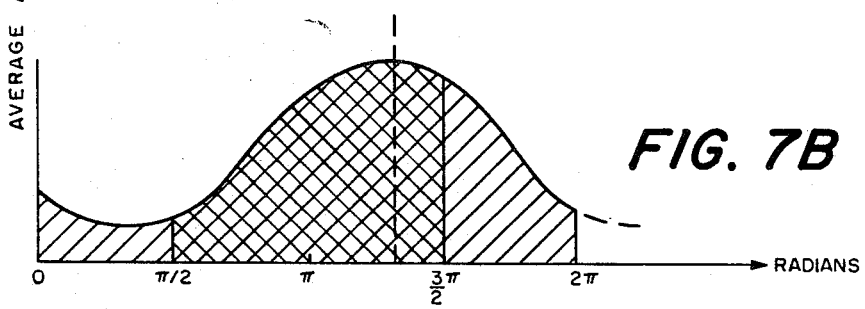

To complete the description of the operation in each frequency selection channel reference is made now to FIGS. 7A and 7B. FIG. 7A represents graphically the relative amplitudes of the segregated signals in the localizer channel as a function of beam scan when the aircraft is at 19, FIG. 1, the latter being indicated by the dashed vertical line. Recalling that maximum received signal strength occurs at the radial scan position coinciding with aircraft position in the beam's cross-section, the solid line curve in FIG. 7A represents the extent of amplitude modulation of the received signal due to beam rotation toward and away from the aircraft. Since the stippled area under the solid line curve is proportional to the power density of the 1 kHz. FLY RIGHT frequency component it is therefore proportional to the positive D.C. potential appearing at the output of detector 103, FIG. 6. Similarly, the blank area under the solid line curve represents the power density of the 2 kHz. FLY LEFT signal frequency and is therefore proportional to the negative D.C. potential available at the output of inverter 109. Hence the difference product produced by summing point 106 may be said to be proportional to the magnitude of the disparity between the stippled and blank areas under the curve. That this disparity is in turn proportional to the magnitude of the aircraft's positional departure to the left of the localizer plane 17 (FIG. 1) may be appreciated by considering what happens when the aircraft is actually flying in coincidence with the localizer plane as, for example, at 20 in FIG. 1 and there is no positional error therebetween. In this case maximum signal strength is received when the center of beam 11 rotates through the 180° radial in its scanning cycle. Accordingly, in reference to FIG. 7A, the space modulation envelope represented by the solid curved line appears to shift to a new position indicated by the dashed curved line. Observe now that maximum amplitude modulation occurs at the required 180° position in the beam scanning cycle. Moreover, note that the stippled area and the blank area under the dashed curve are equal.

Recapitulating then, the amplitude and polarity of the output signal of summing point 106 (FIG. 6) comprises the electrical analog of the magnitude and direction, respectively, of the aircraft's instantaneous position relative to the localizer plane. Therefore, assuming the aircraft is again at 19 (FIG. 1) a positive D.C. voltage will appear on conductor 108 energizing the actuating coil 110 of the localizer bale in cross-pointer 122. In response, the bale moves to the right in proportion thereto and informs the pilot how far right he must steer the aircraft to intersect the localizer plane. Obviously, when the aircraft's position is at 20 (FIG. 1) the output of summing point 106 is zero and the localizer bale remains centered at its null position.

FIG. 7B, of course, represents graphically events in the glide-slope channel when the aircraft is positioned at 19, FIG. 1. The cross-hatched area under the solid line curve corresponds to the power density of the 3 kHz, FLY UP signal component whereas the shaded area represents the power density of the 4 kHz. FLY DOWN frequency component. Inasmuch as the shaded area is the larger of the two, a positive D.C. potential will be made available on line 118 to energize the glide-slope bale and actuate coil 120 in cross-pointer 122. The glide-slope bale will then deflect upwardly informing the pilot to guide his aircraft in that direction in order to intercept the glide-slope plane 16 (FIG. 1).

Although the operation of the receiver has been described so far with singular attention to an aircraft flying in the lower-left quadrant of beam cross-section 15, it will be appreciated that the receiver functions in an identical manner in each of the remaining three quadrants and that therefore a further detailed description relating thereto is believed unnecessary.

With final reference to FIG. 6, it is to be noted that unless compensating means are provided at the receiver, the scale factor of the latter and/or its concomitant indicator will increase undesirably with decreasing distance to the transmitter. What actually happens is that the received signal strength increases and therefore the magnitude of the difference signal at the outputs of summing points 106, 116 will increase despite the fact that the aircraft is flying a constant deviation course relative to the localizer/glide-slope. Thus, as the aircraft closes on the transmitter the indicator bales in the cross-pointer will deflect with no apparent change in the aircraft's course.

To overcome this, automatic gain control circuits are provided in each channel. For example, as shown in FIG. 6, the outputs of each detector 103, 104 in the localizer channel are summed in adder 105 and the latter's output is then applied as negative feedback along conductor 97 to control the gain of amplifier 96 in a known manner. Similarly, in the glide-slope channel the outputs of each detector 113, 114 are summed in adder 115 and fed back through loop 99 to control the gain of amplifier 98. As a result, the output signals on lines 108 and 118 no longer reflect the absolute difference magnitude between the output voltages of the two branches in each channel respectively. Instead, the signals on line 108, 118 are now proporitonal to the ratio of the two voltages appearing at the input of each respective summing point 106, 116. Hence, although the magnitude of each voltage increases as the aircraft gets closer to the transmitter, the ratio therebetween remains constant. Accordingly, the indicator bales in cross-pointer 122 remain stationary as the aircraft descends towards the transmitter on a constant deviation course.

Also, in order to prevent saturation of mixer 94 as the aircraft gets nearer to the transmitter, the output of adder 115 is preferably fed back along conductor 100 to provide AGC for amplifier 93 as generally indicated.

In connection with FIG. 1 it was previously assumed that the transmitter according to the present invention is centrally mounted on the runway near the latter's threshold. This is a perfectly valid assumption because the use of a relatively simple multiplex switching arrangement at the transmitter as that described above permits a single transmitter channel and antenna structure to function as co-located sources for both glide-slope and localizer reference planes.

In tactical military environments such as recently cleared jungle landing strips, for example, where compactness of size and lightness in weight are important criteria, a configuration of the type already described would therefore obviously be desirable.

However, witnessing the extraordinary flexibility of the present invention, is the fact that glide-slope transmission may be space duplexed (i.e., physically separated) relative to localizer transmission without requiring any attendant changes in the receiver portion of the invention. And, although space duplexing the transmitter would seem at first to require an unnecessary redundancy of expensive hardware, the concept does provide for several improvements in overall system performance which are highly desirable in non-tactical applications such as, for instance, large domestic airports.

One advantage of space duplexing the transmitter is to minimize the effect of beam convergence as the approaching aircraft closes on the transmitter. Without going into a detailed explanation as to why, the convergence of the transmitted beam tend to inadvertently increase the scale factor of the receiver and/or the latter's indicator in a manner similar to that discussed above relative to the provision of automatic gain control circuits in the receiver. That is, as the aircraft gets closer to the transmitter the indicator bales on the cross-pointer indicator will be seen to deflect more and more despite the fact that the aircraft maintains a constant deviation course relative to the intersection of the localizer and glide-slope planes; the effect being particularly bothersome in the localizer plane since it is relatively easy to maintain the aircraft on the proper glide-slope path. For a detailed discussion of this problem reference may be had to Patent 3,354,460, entitled Redundant Runway Localizer Landing System, and assigned to the assignee of this invention.

Figure 8:
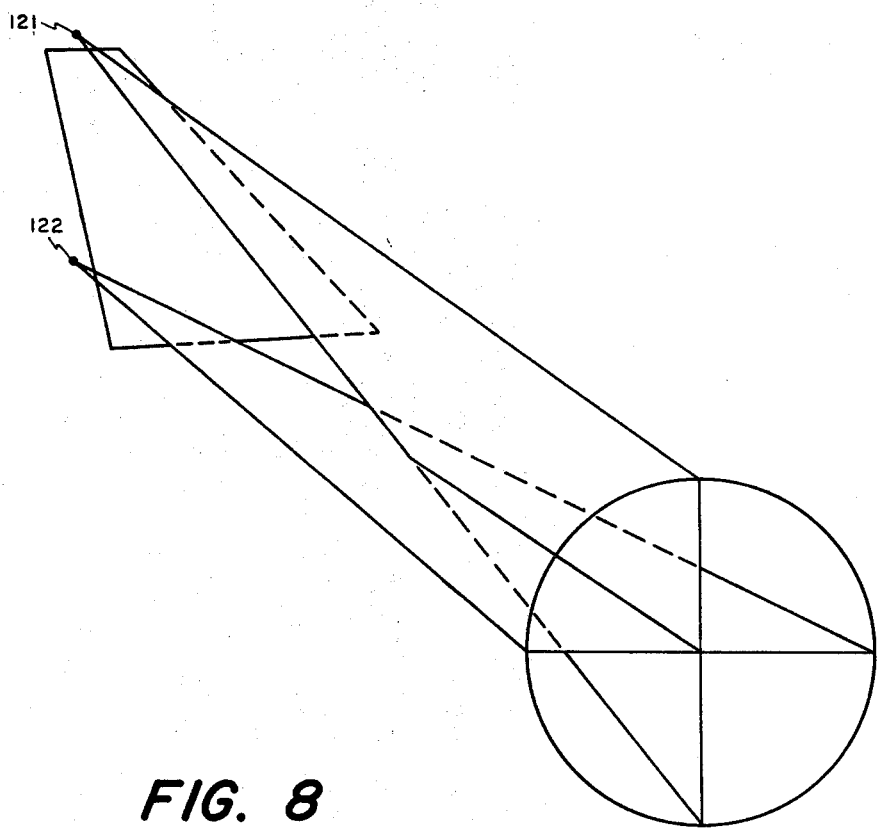
FIG. 8 is a perspective sketch indicating an alternative transmitter configuration in accordance with the invention.

It has been found that by locating the localizer transmitter at the rear threshold of the runway as indicated schematically by reference character 121 in FIG. 8 the effects of beam convergence while not being entirely eliminated are sharply reduced. As a dividend the aircraft retains the benefit of the localizer reference after touchdown and for a substantial portion of the runway thus helping the pilot to avoid an off-runway heading while rolling out under zero visibility conditions. The glide-slope transmitter may then be positioned almost anywhere in proximity to the runway; however, it is preferable to locate it to one side near the latter's approach end as indicated, for example, by reference character 122, FIG. 8. In this situation, the localizer transmitter is still boresighted in alignment with the runway centerline while the glide-slope transmitter is now boresighted at an angle equal to the preselected glide path and at an angle to the runway centerline so that the cross-sections of the respective transmitted beams converge coextensively in space as generally indicated. Thus it will be further noted that the alternative arrangement schematically depicted in FIG. 8 is particularly advantageous in that there are no transmitter components directly in the expected path of the descending aircraft.

The transmitter of FIG. 3 may be modified in an obvious manner to provide either a localizer or a glide-slope transmitter when it is desired to transmit in the spaced duplexed mode of FIG. 8. For example, in order to transform the transmitter of FIG. 3 into a localizer transmitter all that is necessary is to ground the 90° and 270° contacts in wiper arm assembly 34 and directly couple the output of RIGHT/LEFT selector 42 to single sideband modulator 23 after removing the following components:

Flip-flop #2 in block 40
MULTIPLEXER 53
UP/DOWN selector 43
UP/DOWN pulse generators 46, 47
OR gate 56
MULTIPLEX SAMPLE RATE generator 55

Figure 9A:
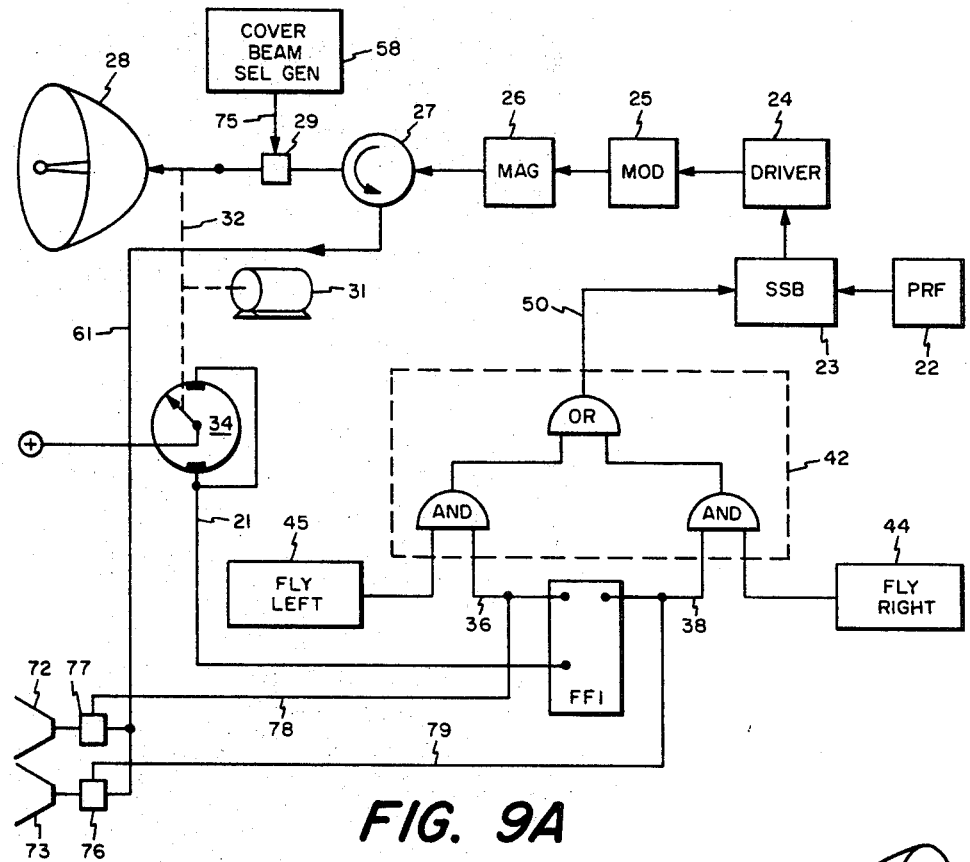
FIGS. 9A and 9B are circuit diagrams of the transmitters employed in the embodiment of FIG. 8.

The resulting LOCALIZER transmitter will then appear as shown in FIG. 9A.

Similarly, in order to transform the FIG. 3 transmitter into an exclusive glide-slope transmitter it is only necessary to ground the 0° and 180° contacts in wiper arm assembly 34 and directly couple the output of UP/DOWN selector 43 to single sideband modulator 23 after removal of the following hardware:

Microwave circulator 27
Switching diodes 29, 76, 77
Auxiliary antennas 72, 73
Feed waveguide 61
Flip-flop #1 in block 40
Multiplexer 53
OR gate 56
Multiplex sample rate generator 55
Cover beam selector generator 58
RIGHT/LEFT selector 42
RIGHT/LEFT pulse generators 44, 45

Figure 9B:
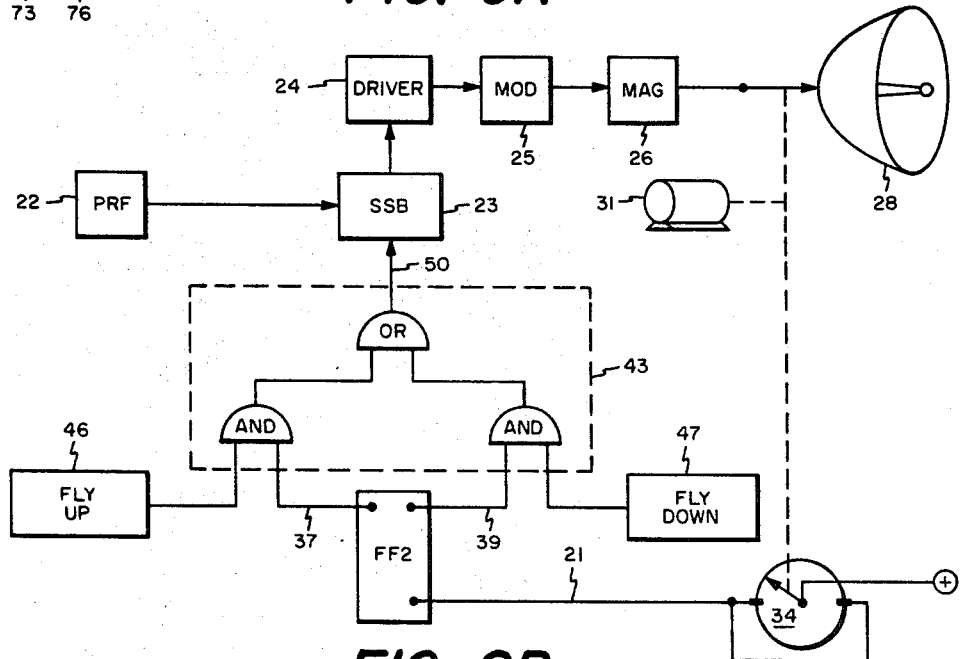

The resulting GLIDE-SLOPE transmitter would then appear as schematically illustrated in FIG. 9B.

It will be appreciated that the accumulative effects of the two transmitters operating simultaneously in the space duplexed mode are identical to those produced by the single multiplexed transmitter of FIG. 3 but for the fact that in the former case the two pulse repetition frequencies generated in each quadrant of the beam rotation cycle are simultaneously present in space whereas in the latter case the two pulse repetition frequencies alternately appear in space on a time shared basis. Notwithstanding, the receiver cannot tell the difference in either case and for this reason no changes are necessary in receiver circuitry when operating in either the multiplex mode or the space duplexed mode.

The discussion above relating to cover beam transmission and reception was specifically disclosed in reference to side cover beams relative to the LOCALIZER plane. However, this was done merely by way of illustration and was not intended to limit the invention as such. On the contrary, it should be apparent to those skilled in the art that by using similar principles and instrumentalities upper and lower cover beams may be transmitted and received relative to the GLIDE-SLOPE plane as well.

Likewise, the requirement that a main antenna assembly be used for generating a beam rotating periodically among the quadrants fixed in space was cited merely by way of example. Obviously, a non-rotating-beam antenna such as, for example, one of the multi-array type which latter is capable of switching a fixed beam among a plurality of preselected positions is capable of being used herein without departing from the principles of the invention.

Thus, although the present invention has been described above to specifically illustrate the preferred embodiments thereof; it is to be understood that all equilavents, alterations and modifications within the spirit and scope of the present invention are herein meant to be included.

What is claimed is:

1. Navigational apparatus comprising,
antenna means for establishing a discrete field of electromagnetic energy in space and for translating said field relative to an imaginary pair of mutually orthognal planes fixed in space whereby said field physically scans each successive quadrant in space defined by said mutually orthogonal planes over a finite time interval,
means operatively responsive to said antenna means for generating a continuous signal having first, second, third and fourth discrete frequency components, said first and third frequency components being generated only when said field scans a first one of said quadrants defined in space, said second and third frequency components being generated only when said field scans a second one of said quadrants, said second and fourth frequency components being generated only when said field scans a third one of said quadrants, said first and fourth frequency components being generated only when said field scans a fourth one of said quadrants,
electromagnetic energy generator means,
means responsive to said continuous signal for driving said electromagnetic energy generator means at different pulse repetition rates determined respectively by each of said frequency components,
waveguide means coupling said electromagnetic energy generator means to said antenna means,
receiver means including means for detecting said electromagnetic energy field and deriving signals therefrom representing each of said different pulse repetition rates,
said receiver further including a pair of frequency selection channels, each of said channels being responsive to preselected ones of said different pulse repetition rate signals for deriving additional signals proportional to the lateral displacement of an airborne vehicle relative to a different one of said orthogonal planes,
one of said frequency selection channels including filter means for passing only those pulse repetition rate signals corresponding to said first and second frequency components, and
the other one of said frequency selection channels including filter means for passing only those pulse repetition rate signals corresponding to said third and fourth frequency components.

2. The apparatus of claim 1 further comprising,
means responsive to said additional signals for displaying the orthogonalized components of said lateral displacement in analog form.

3. The apparatus of claim 1 wherein,
said means for generating said continuous signal further includes multiplexing means for alternately inhibiting the generation of first one and then the other of said frequency components during each of said quadrant field scans at a rate different from the rate of scan of said field.

4. The apparatus of claim 1 further comprising,
a pair of branch circuits commonly coupled to the filter means in each of said frequency selection channels, each of said branch circuits including additional filter means for exclusively passing a different one of said pulse repetition rate signals corresponding to said first, second, third and fourth frequency components,
separate rectifier means coupled to each of said filter means in each of said branch circuits,
common comparator means in each of said frequency selection channels responsive to the rectified output signal in each branch circuit, and
vehicle position indicator means responsive to each of said comparator means.

5. The apparatus of claim 1 further comprising,
auxiliary antenna means for transmitting discrete cover beams laterally offset to either side of at least one of said imaginary orthogonal planes,
second waveguide means coupling said electromagnetic energy generator means to said auxiliary antenna means,
switch means for feeding electromagnetic energy from said generator means through said first mentioned waveguide means when unactuated and for feeding electromagnetic energy from said generator means through said second waveguide means when actuated,
means for providing cover beam timing signals,
actuatable means for inhibiting the generation of said first and second frequency components,
said last mentioned means and said switch means being operatively responsive to said timing signals.

6. In an instrument landing system for directing an approaching aircraft to a landing strip, the combination comprising, first transmitter means situated substantially at the aft end of the said runway for establishing a localizer reference plane in space, said localizer plane being normal to said runway and substantially in alignment with the latter's longitudinal center line, said first transmitter means including antenna means for generating a first rotating beam of microwave energy about an axis located in said reference localizer plane whereby said rotating beam is alternately positioned to the left and to the right of said reference localizer plane at periodic intervals in time, microwave generator means, main waveguide means coupling said generator means to said antenna means, means responsive to said antenna means for generating a discrete FLY LEFT frequency signal during the time interval said first microwave beam is positioned to the right of said localizer plane and for generating a different discrete FLY RIGHT frequency signal during the time interval said microwave beam is positioned to the left of said localizer plane, and modulator means coupled to said last mentioned means for driving said microwave generator means at different pulse repetition rates determined by said different discrete FLY RIGHT and FLY LEFT frequency signals respectively, second transmitting means located substantially near the threshold of said runway for establishing a glide-slope reference plane in space, said glide-slope plane being elevated relative to said runway in alignment with a preselected glide-slope approach path whereby said localizer plane and said glide-slope plane intersect orthogonally in space, said second transmitter means including antenna means for generating a second rotating beam of microwave energy about an axis located in said glide-slope reference plane whereby said rotating beam is alternately positioned above and below said glide-slope reference plane at periodic intervals of time, microwave generator means, waveguide means coupling said generator means to said antenna means, means responsive to said antenna means for generating a discrete FLY DOWN frequency signal during the time interval said second microwave beam is positioned above said glide-slope plane and for generating a different discrete FLY UP frequency signal during the time interval said microwave beam is positioned below said glide-slope reference plane, and modulator means coupled to said last mentioned means for driving said microwave generator means at different pulse repetition rates determined by said different discrete FLY UP and FLY DOWN frequency signals respectively, receiver means adapted to be mounted aboard said approaching aircraft, said receiver means including means for detecting said first and second pulsed microwave beams and for recovering signals therefrom representing said different pulse repetition rates and therefore said different FLY LEFT, FLY RIGHT, FLY DOWN and FLY UP frequencies, frequency selection means coupled to said last mentioned means, said frequency selection means including a first branch circuit having filter means for passing only said FLY LEFT frequency signal, a second branch circuit having filter means for passing only said FLY RIGHT frequency signal, a third branch circuit having filter means for passing only said FLY DOWN frequency signal, and a fourth branch circuit having filter means for passing only said FLY UP frequency signal, first and second differential means commonly coupled to the filter means in said first and second branch circuits and said third and fourth branch circuits, respectively, and position indicator means responsive to said first and second differential means.

7. The system of claim 6 wherein said first transmitter means further includes, a pair of auxiliary antennas for transmitting FLY LEFT and FLY RIGHT cover beams respectively, auxiliary waveguide means for coupling said first mentioned microwave generator to said auxiliary antennas, microwave switching means for coupling only said main waveguide means to said first mentioned microwave generator means when unactuated and for coupling only said auxiliary waveguide means to said first mentioned microwave generator means when actuated, and means for generating cover beam timing pulses coupled to said switching means for periodic actuation thereof at a predetermined rate.

8. In a blind landing system comprising, first transmitter means for generating a first conically scanned beam of electromagnetic energy in space, said transmitter means including means for encoding each half scan of said first beam with a different pulse repetition frequency respectively, each of said half scans being referenced in space relative to a first plane, second transmitter means for generating a second conically scanned beam of electromagnetic energy coextensively in space with respect to said first conically scanned beam, said second transmitter means including means for encoding each half scan of said second beam with a different pulse repetition frequency respectively, said last mentioned pulse repetition frequencies differing respectively from the pulse repetition frequencies encoding said first beam, said last mentioned scans being referenced in space relative to a second plane orthogonal to said first mentioned plane whereby each quadrant in space scanned simultaneously by said coextensively related beams includes a distinct pair of encoded pulse repetition frequencies respectively, and receiver means for detecting said different pulse repetition frequencies and distinguishing therebetween.

References Cited

UNITED STATES PATENTS

| | | | |
|---|---|---|---|
| 2,587,995 | 3/1952 | Griggs | 343—108 |
| 2,945,225 | 7/1960 | Sperber | 343—108 |
| 3,309,708 | 3/1967 | Toman et al. | 343—108 |
| 3,191,175 | 6/1965 | Battle et al. | 343—108 |

RODNEY D. BENNETT, *Primary Examiner.*

H. C. WAMSLEY, *Assistant Examiner.*